United States Patent [19]

Etter

[11] 4,088,283
[45] May 9, 1978

[54] DEVICE FOR GUIDING A TAPE OUT OF A CASSETTE OPENING

[75] Inventor: Walter Etter, Valeyres sous Montagny, Switzerland

[73] Assignee: Bolex International SA, Ste-Croix, Switzerland

[21] Appl. No.: 744,778

[22] Filed: Nov. 24, 1976

[30] Foreign Application Priority Data

Nov. 28, 1975 Switzerland .................. 15521/75

[51] Int. Cl.² ................... G03B 1/04; G11B 15/32; G11B 23/04
[52] U.S. Cl. .................................. 242/197; 242/210; 226/91
[58] Field of Search .................. 242/188–190, 242/195, 206–210, 197; 226/91, 92; 352/157, 158; 360/71–74

[56] References Cited

U.S. PATENT DOCUMENTS

| | | | |
|---|---|---|---|
| 3,854,677 | 12/1974 | Martin et al. | 242/195 |
| 3,880,382 | 4/1975 | Jantzen et al. | 242/195 |
| 3,912,205 | 10/1975 | Koyama | 242/188 |
| 3,931,920 | 1/1976 | Hellinger | 226/91 |
| 3,934,840 | 1/1976 | Inaga | 242/195 |

*Primary Examiner*—Leonard D. Christian
*Attorney, Agent, or Firm*—Fleit & Jacobson

[57] ABSTRACT

A device for guiding a tape-shaped record-carrier, particularly films, out of the opening of a cassette which contains at least one tape-winding device with at least one collector that is arranged, in a first position, on the side of the tape facing towards the opening, and in a second position at a distance from the cassette, so that a loop of the tape may be guided out.

9 Claims, 5 Drawing Figures

4,088,283

DEVICE FOR GUIDING A TAPE OUT OF A CASSETTE OPENING

BACKGROUND OF THE INVENTION

In U.S. Pat. No. 3,702,383, a video appliance is described that may be loaded with cassettes which contain the information carrier medium, e.g., a tape. This tape-shaped information carrier is freely accessible through an opening in the cassette wall located between the storage spool and the winding spool. When this cassette is placed into the applicance, several finger-like levers are inserted into the opening and are then arranged behind the tape. When the operation of the video appliance is started, the fingers are controlled by complex cam mechanisms and are moved out of the cassette's opening at a right angle to the direction of the tape movement. In this way, the levers, with the tape pulled out of the cassette, form a loop with a diameter greater than that of the drum which is used for video projection. Inasmuch as the tape loop is formed above the video drum, it subsequently falls over the drum by the force of gravity when the cam controlled fingers are retracted to a smaller diameter. As it happens, this device does not operate in a very efficient manner, despite its considerable technical extravagance, because the tape from the fingers drop over the drum in an undefined manner. In addition, the guiding devices that hold the tape against the drum when information is recorded or played back, must be sufficiently distant from the drum during threading to leave enough room for the falling tape. Because of this, the entire device must necessarily be made rather large.

It is therefore an object of the device of the present invention to make possible the friction-less and trouble-free removal of a record-carrier stored in the manner described above with a minimum of technical investment.

SUMMARY OF THE INVENTION

In order to accomplish the stated objective, apparatus is provided in which a collector mechanism may be swivelled around an axis that runs over more or less parallel to the direction of the movement of the tape in the opening of the cassette before the extraction of the tape. The angle of rotation of the collector is of such a magnitude that the collector will move, during the final phase of its movement, out of the plane that is defined by the edge of the tape turned toward the swivel axis of the collector. The tape is caught by the collector and, by placing the swivel axis of the collector in a position in accordance with the invention, it is made to engage directly the various tape-guiding devices. This means that the tape does not make any uncontrolled movements during any phase of the threading process. This pattern proved to be particularly attractive when the tape to be removed from the cassette is very thin and flexible. An additional feature of the invention applies when the cassette has been placed in a holding device that can be adjusted from a loading position, during which the cassette may be inserted, to an operating position, during which the tape is guided out of the cassette to be played back. According to this additional feature of the invention, a coupling or engagement is made between the device holding the cassette and the collector mechanism such that the collector assumes its first position in the loading position of the holding device. Then, when the holding device is moved into the operating position, the collector is swung away, out of the area of the opening of the cassette and the required loop of tape is withdrawn. When the process of withdrawing the loop from the tape cassette is completed, the collector will carry out an additional slight angular movement so as to make certain of the disengagement of collector mechanism and the tape.

When the tape, or the loop of tape which has been guided out of the cassette, is to be rewound into the cassette, it is possible in accordance with an additional feature of the invention, to thrust a second surface of the collector (as opposed to the first surface which engages the tape when it is guided out of the cassette) onto an edge of the tape during its swinging movement from the second position into the first and, thereby lift the tape out of the guiding devices. After that outward thrust, it is advisable to switch on a winding motor to activate the take-up spool.

DETAILED DESCRIPTION OF THE PREFERRED EMBODIMENT

Figure 1:
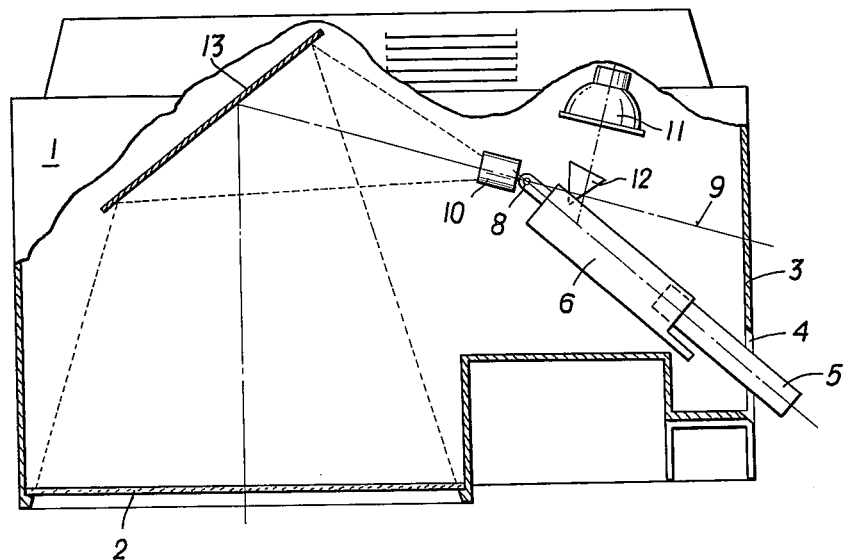
FIG. 1 is a plan view of a video projector having a portion of its case cut away.

Referring now to FIG. 1, a video projector having a portion of the casing 1 cut away is shown. On the anterior surface of the projector a viewing screen 2 has been mounted. On lateral wall 3 of the casing 1, an opening 4 has been provided through which a cassette 5 can be inserted into a cassette receptacle 6. In order to switch the casette receptacle 6 to the projecting position, it has to be swivelled around a pivot point 8, until cassette 5 and/or the film stored in it is positioned in line with the optical axis 9. The optical axis 9 is defined by a projection lens 10 that projects light originating in a projection lamp 11 and which is thrown from the prism 12 onto the film stored in the cassette 5, and subsequently onto screen 2 by way of deflecting mirror 13. Cassette 5 and/or cassette receptacle 6 includes a recess 19 which is shown in FIG. 2 in greater detail, so that prism 12 can be moved into the cassette 5, when said cassette is in an operating position, so that prism 12 deflects the projection light issuing from lamp 11 onto and through the film or tape.

When the film which is stored in the cassette 5 is a sound film with a magnetic-edge track, contact has to be established between the film and the sound equipment. In that case, it is often impossible, due to lack of space, to move the sound equipment right next to the cassette, particularly with motion-picture films where, e.g. in the case of the super-8 format, the sound has been recorded on the film at a distance of eighteen picture-frames from the matching film picture. For that reason, it is customary to pull the film out of the cassette and to form a loop, in order to permit the sound pick-up device to engage the magnetic-edge track at the desired picture-sound distance.

Figure 2A:
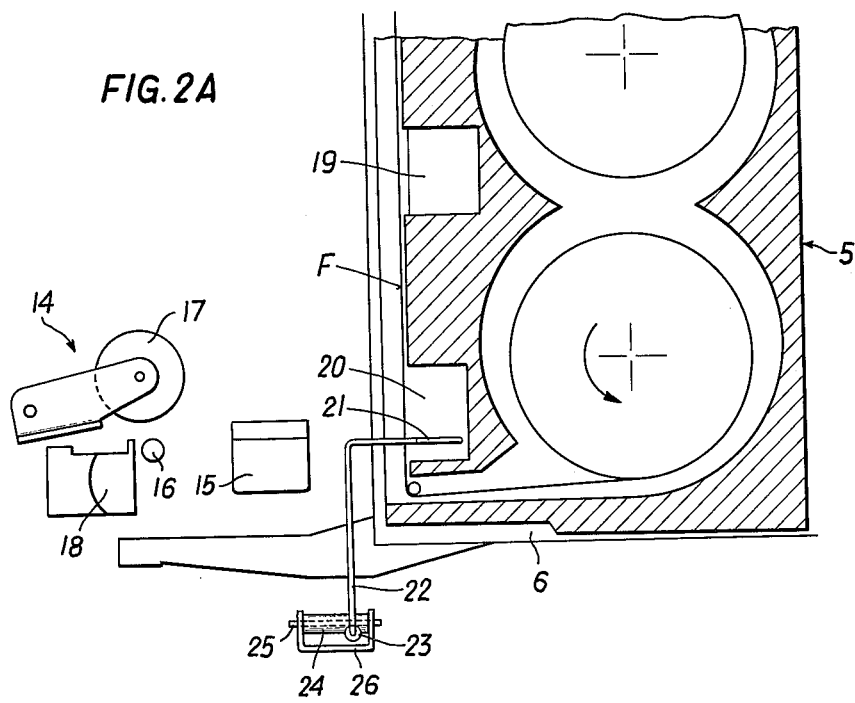
FIG. 2A is a plan view of the preferred embodiment of the invention.

Referring now to FIG. 2, a preferred embodiment of the device in accordance with the invention, to the extent that cassette 5 and sound equipment 14 are concerned is shown. This sound equipment consists of a magnetic pick-up head 15, a driving spindle or capstan 16 that is coupled with a motor which is not shown, a rubber pressure roller 17 which causes the film to engage the driving spindle, and lastly, of a pressure guide 18. Within the cassette 5, film F is placed across the recess 19 provided for the prism 12 and across an additional opening 20 which has been provided in the cassette so that a hook 21 may be inserted therein. This hook 21 is part of a wire collector 22 that is anchored in socket 23. This socket 23 may be rotated, by use of a support 24, around a spindle 25.

Figure 2B:
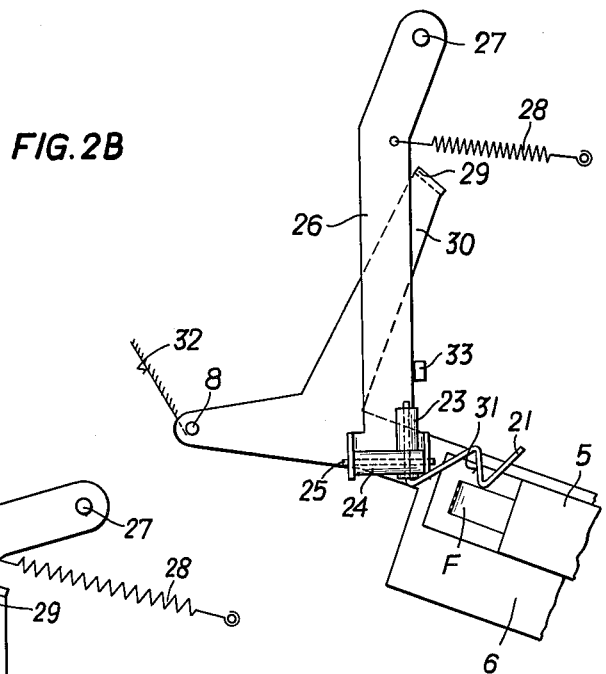
FIG. 2B is a plan view of the device of the present invention in one stage of operation.
Figure 3:
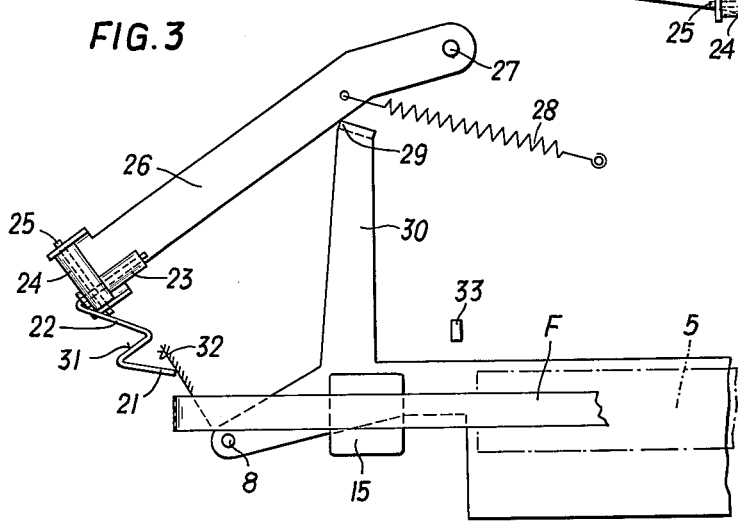
FIG. 3 is a plan view of the device of the present invention is a subsequent stage of operation.

Referring to FIG. 2B, spindle 25 is shown supported by lever 26 that may be rotated around a spindle 27 which is parallel to the direction the film moves before its extraction, within recesses 19 and 20. Lever 26 is biased or loaded by a spring 28 in the direction of the cassette 5, but at the same time is held away by extension 29 of arm 30 of cassette receptacle 6. When the cassette receptacle 6 containing the cassette 5 is moved to the operating position, the cassette receptacle 6 is swung counter-clockwise around spindle 8. Thereby, the film F engages the hook 21 and/or its edge 31, in recess 20. Simultaneously, lever 26 which is held by the spring 28 against extension 29 of the cassette receptacle 6 is swung clockwise around sprindle 27, hook 21 then pulls the film F out of the cassette 5. Referring now to FIG. 3, in order to balance the length of the path of the film to be unthreaded with the angle of rotation of lever 26, in relation to the position of the sound equipment, the end of wire collector 22 is propped up on a slanted plane 32, almost at the end of the unthreading process in such a way that the collector swings around spindle 25. In that way, film F which has been laid around the pressure guide, 18 of FIG. 1, is disengaged from edge 31 of the hook 21 whereby the process of threading the film onto the sound equipment has been completed. Lever 26 may still be forced to rotate through an additional angle until the cassette 5 has been transferred to a position aligned with the optical axis as shown at 9 in FIG. 1. In this position, cassette receptacle 6 can remain fixed, and film projection can begin. Lever 26 lies firmly against extension 29, due to the action of tension spring 28. If desired, the stress of spring-loaded lever 26 may be removed from arm 30, by supplying a blocking device for lever 26 which locks it in an intermediate position during its movement into its first position, as described above during insertion of the cassette.

Figure 4:
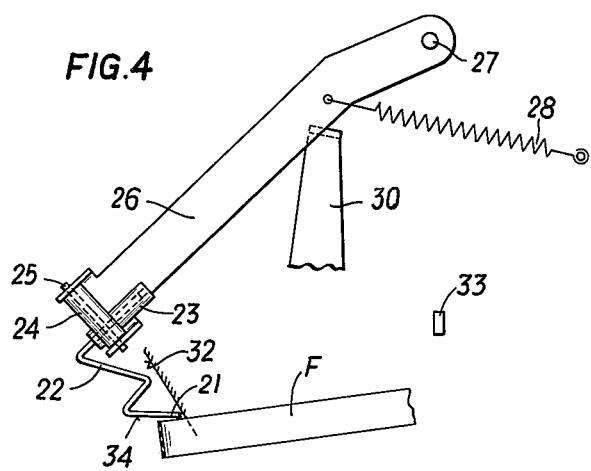
FIG. 4 is a plan view of the device of the present invention in another stage of operation.

Referring now to FIG. 4, in order to remove the cassette 5 from receptacle 6 after the projecting process, it is first necessary to unthread film F from the sound equipment. By actuating a key or driver, which need not be shown in any detail, lever 26 is shifted along spindle 27, for a short distance and is thereby disengaged from the extension 29 located at the end of lever 30. Spring 28, which has been extended, now pulls lever 26 counter-clockwise into the initial position, up against stop 33 as shown in FIG. 2B, and edge 34 of wire collector 22 pushes film F down out of the sound equipment 14. By the actuation of the aforementioned key, the driving mechanism of the take-up spool is activated for a short time, so that unthreaded piece of film F will be retracted into cassette 5. A return spring for this key is able, at the same time, to shift lever 26 back to the original position along spindle 27, so that extension 29 again engages lever 26, following the swinging of cassette receptacle 6 into the position as shown in FIG. 2B. This key could also unblock the blocking device which was described above.

It is, of course, understood that the device in accordance with the invention is not limited to use in video or motion-picture film projectors. It can be imagined that such unthreading devices may also be mounted on cassette cameras with sound recording equipment or, possibly on other magnetic-tape cassette instruments. In addition, it is not necessary to couple the unthreading device with the drive of the cassette-recording device, but a separate drive, for example, a spring may be provided as the part that guides film F out of the cassette.

What is claimed is:

1. Apparatus for extracting a tape-shaped record carrier from a cassette of the type having an opening exposing said tape and at least one tape winding device, comprising at least one tape collector means movably mounted for transition between a first position on the side of the tape facing towards said opening of said cassette to a second position at a distance from the cassette such that a loop of tape may be guided out of the opening of said cassette, and a pivot means affixed to and rotatably mounting one end of said tape collector means and disposed substantially parallel to the direction of movement of said tape prior to its extraction from said cassette, said pivot means being rotatably and rotatably mounting mounted and rotatably mounting such that the angle of rotation of the tape collector means between said first position and said second position is of such magnitude that the tape collector means will move out of the plane that is defined by the surface of the tape in its extracted position.

2. The apparatus of claim 1, further comprising means for holding said cassette and being pivotally mounted such that it may assume a loading position and operating position such that when said means for holding said cassette is in the loading position and said tape collector means is in said first position said means for holding said cassette and said tape collector means are in intimate contact.

3. The apparatus of claim 1, further comprising guide means arranged to guide said tape collector means during at least part of its movement, and second pivot means arranged substantially perpendicular to said first pivot means and cooperating with said tape collector means such that said tape collector means may be rotated about said second pivot means.

4. The apparatus of claim 1, further comprising tape guide means wherein said tape collector means comprises a first surface that interacts with the tape during its extraction and a second surface that contacts an edge of the tape when said tape collector means has been moved to said second position, thereby lifting said tape edge out of contact with said tape guide means.

5. The apparatus of claim 2, further comprising a spring means attached to said tape collector means and wherein said tape collector means may be moved from said first to said second position by said holding device thereby loading said spring means, and a device for disconnecting said intimate contact such that said tape collector means is driven into said first position by the action of said spring thereby lifting said tape out of said tape guide means.

6. The apparatus of claim 5, further comprising a locking means arranged for locking said tape collector means in an intermediate position during its movement from said second position into said first position.

7. The apparatus of claim 6, wherein said locking means is connected with said means for holding said cassette such that said locking means releases said tape collector means when said means for holding said cassette moves from the said operating position to said loading position.

8. The apparatus of claim 6, further comprising an actuatable switch means electrically connected to energize said tape winding means, and linkage means for mechanically connecting said locking means and said switch means such that upon disconnection of said intimate contact said switch means is actuated and said tape winding means is energized.

9. The apparatus of claim 1, wherein said tape collector means further comprises a roller means arranged to engage said tape.

* * * * *